US009820011B2

(12) United States Patent
Pasko

(10) Patent No.: US 9,820,011 B2
(45) Date of Patent: Nov. 14, 2017

(54) DETECTING AND PREVENTING FALSE TELEVISION VIEWERSHIP

(71) Applicant: Verizon Patent and Licensing Inc., Arlington, VA (US)

(72) Inventor: Douglas M. Pasko, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 517 days.

(21) Appl. No.: 14/513,560

(22) Filed: Oct. 14, 2014

(65) Prior Publication Data

US 2016/0105702 A1    Apr. 14, 2016

(51) Int. Cl.

| | | |
|---|---|---|
| *H04H 60/33* | (2008.01) | |
| *H04N 5/445* | (2011.01) | |
| *H04N 21/81* | (2011.01) | |
| *H04N 21/442* | (2011.01) | |
| *H04N 21/45* | (2011.01) | |
| *H04N 21/258* | (2011.01) | |
| *H04N 21/24* | (2011.01) | |
| *H04N 21/441* | (2011.01) | |
| *H04N 21/237* | (2011.01) | |
| *H04N 21/262* | (2011.01) | |
| *H04N 21/431* | (2011.01) | |
| *H04N 21/433* | (2011.01) | |

(52) U.S. Cl.
CPC ......... *H04N 21/812* (2013.01); *H04N 21/237* (2013.01); *H04N 21/2407* (2013.01); *H04N 21/25875* (2013.01); *H04N 21/26241* (2013.01); *H04N 21/4316* (2013.01); *H04N 21/4331* (2013.01); *H04N 21/441* (2013.01); *H04N 21/44222* (2013.01); *H04N 21/4532* (2013.01)

(58) Field of Classification Search
CPC ......... H04N 21/2407; H04N 21/25875; H04N 21/25891; H04N 21/441; H04N 21/44222; H04N 21/4532
See application file for complete search history.

(56) References Cited

U.S. PATENT DOCUMENTS

| | | | | |
|---|---|---|---|---|
| 9,590,969 | B2 * | 3/2017 | Reno | H04L 63/08 |
| 2004/0003253 | A1 * | 1/2004 | Ogino | G06Q 20/401 |
| | | | | 713/176 |
| 2007/0233562 | A1 * | 10/2007 | Lidwell | G06Q 30/02 |
| | | | | 705/14.66 |
| 2008/0114762 | A1 * | 5/2008 | Fukuda | G06Q 30/02 |
| 2008/0249856 | A1 * | 10/2008 | Angell | G06Q 30/0271 |
| | | | | 705/14.67 |

(Continued)

*Primary Examiner* — James R Sheleheda

(57) ABSTRACT

A device receives instructions to record particular content and repeatedly play the recorded particular content. The device records the particular content based on the instructions, and repeatedly plays the recorded particular content based on the instructions. The device performs fraud checks based on the instructions, and determines whether the instructions are fraudulent based on the fraud checks. The device selectively provides, based on whether the instructions are fraudulent, viewership information for the particular content to a ratings device associated with a ratings entity. The viewership information for the particular content is provided to the ratings device when the instructions are not fraudulent, and is discarded when the instructions are fraudulent.

20 Claims, 14 Drawing Sheets

(56) References Cited

U.S. PATENT DOCUMENTS

| | | | | |
|---|---|---|---|---|
| 2012/0278142 A1* | 11/2012 | Li | ............................ | G06Q 30/02 |
| | | | | 705/14.1 |
| 2013/0339523 A1* | 12/2013 | Lopatecki | ................ | G06F 15/16 |
| | | | | 709/224 |
| 2014/0026158 A1* | 1/2014 | Rowe | ...................... | H04H 60/31 |
| | | | | 725/18 |
| 2014/0129447 A1* | 5/2014 | Ranalli | ................... | G06Q 20/29 |
| | | | | 705/44 |
| 2015/0262226 A1* | 9/2015 | Howe | ................. | G06Q 30/0248 |
| | | | | 705/14.47 |
| 2015/0262256 A1* | 9/2015 | He | ..................... | G06Q 30/0276 |
| | | | | 705/14.45 |
| 2017/0053307 A1* | 2/2017 | Schler | ................. | G06Q 30/0248 |
| 2017/0193569 A1* | 7/2017 | Nedelman | .......... | G06F 17/30864 |

* cited by examiner

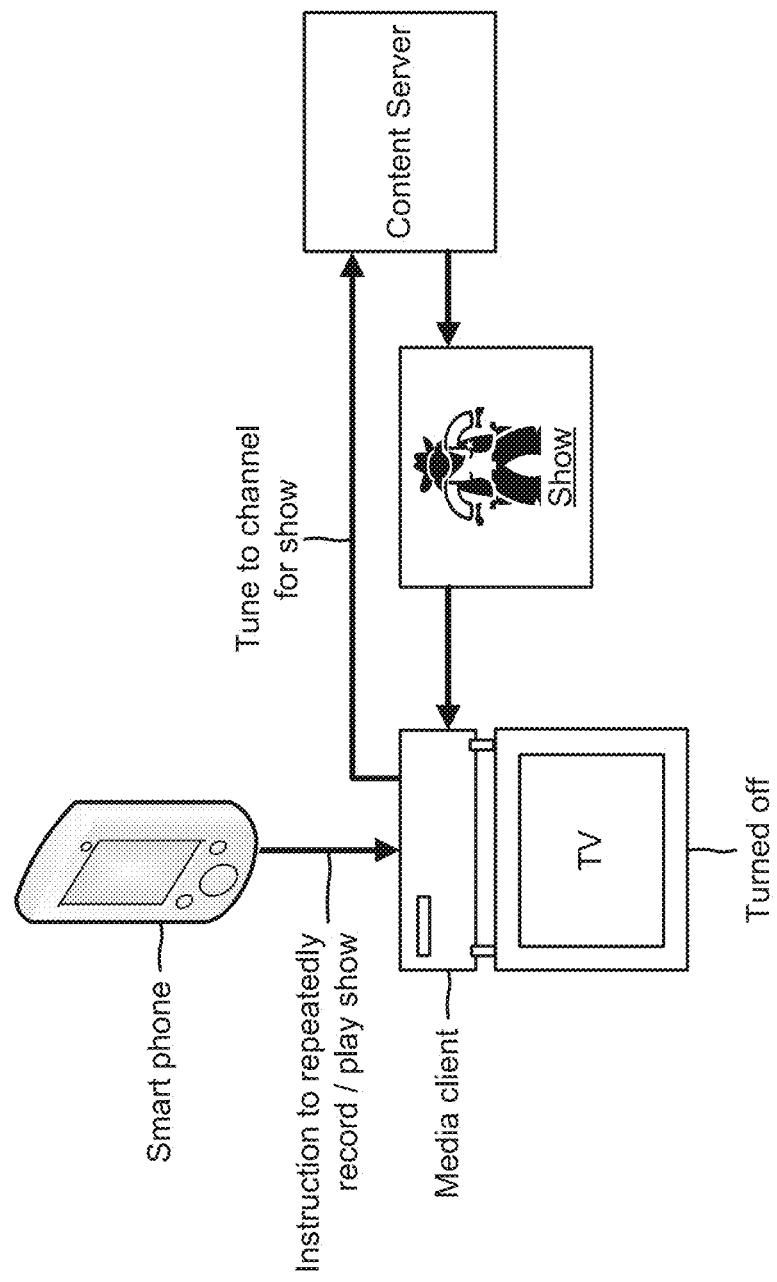

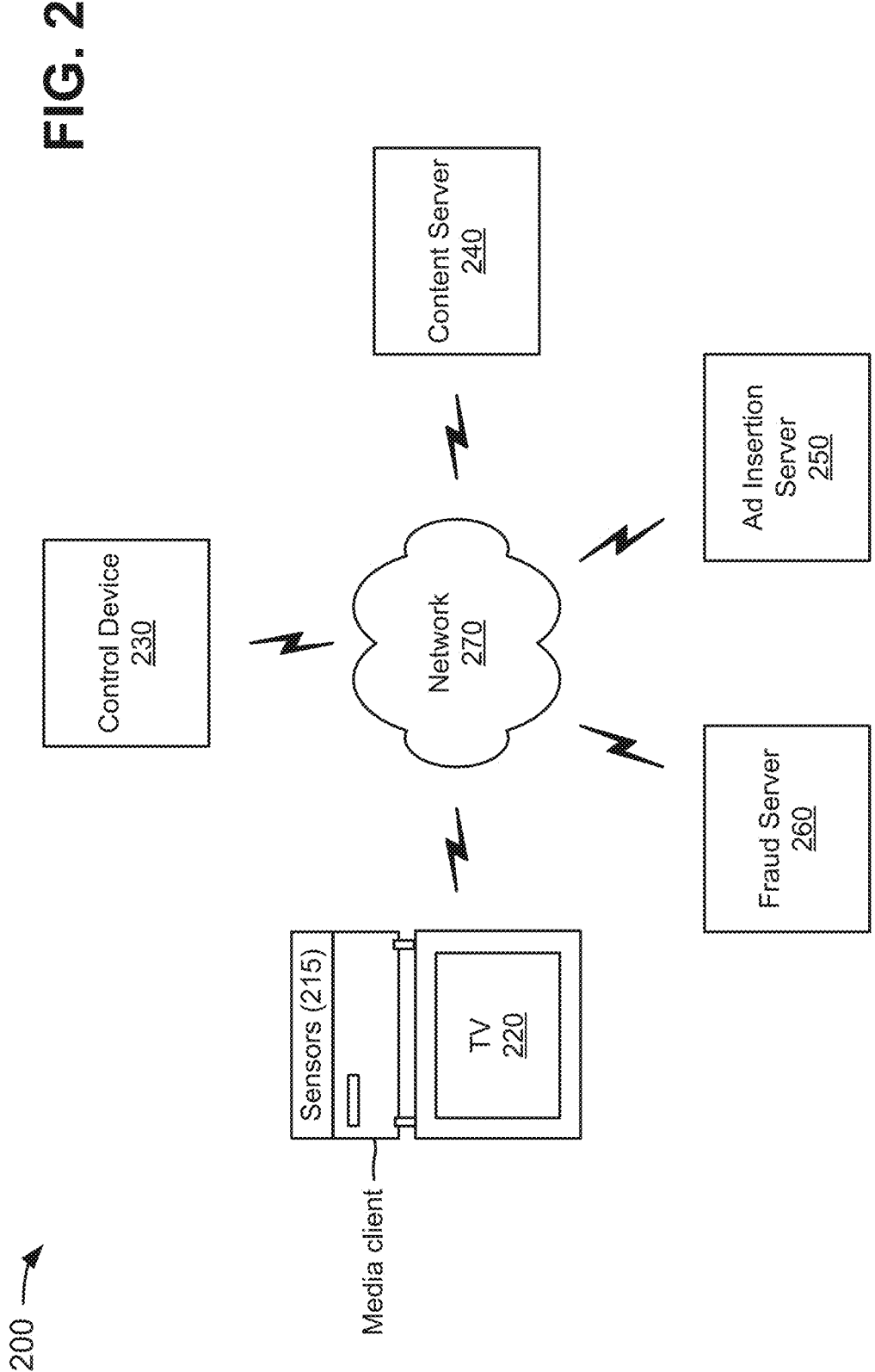

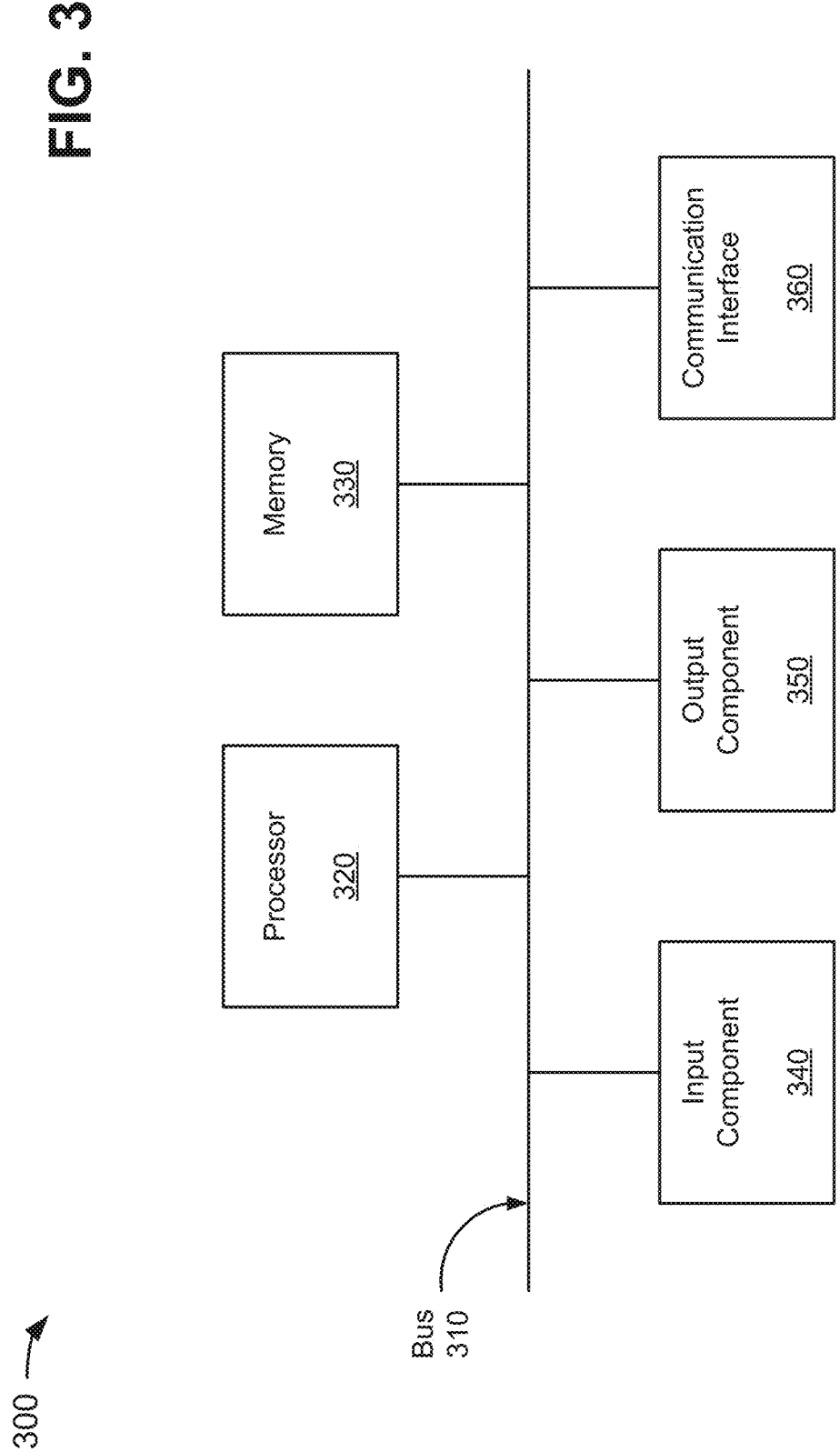

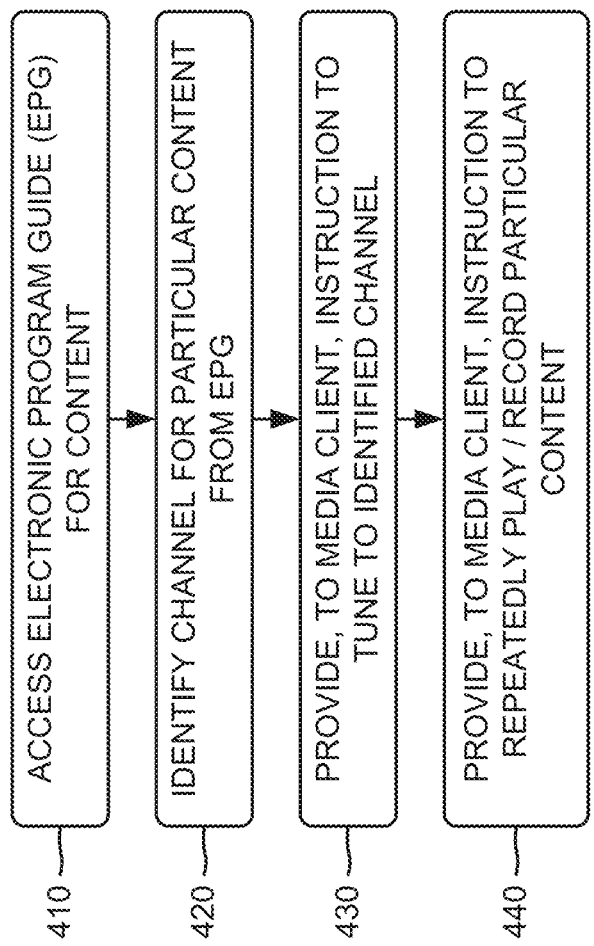

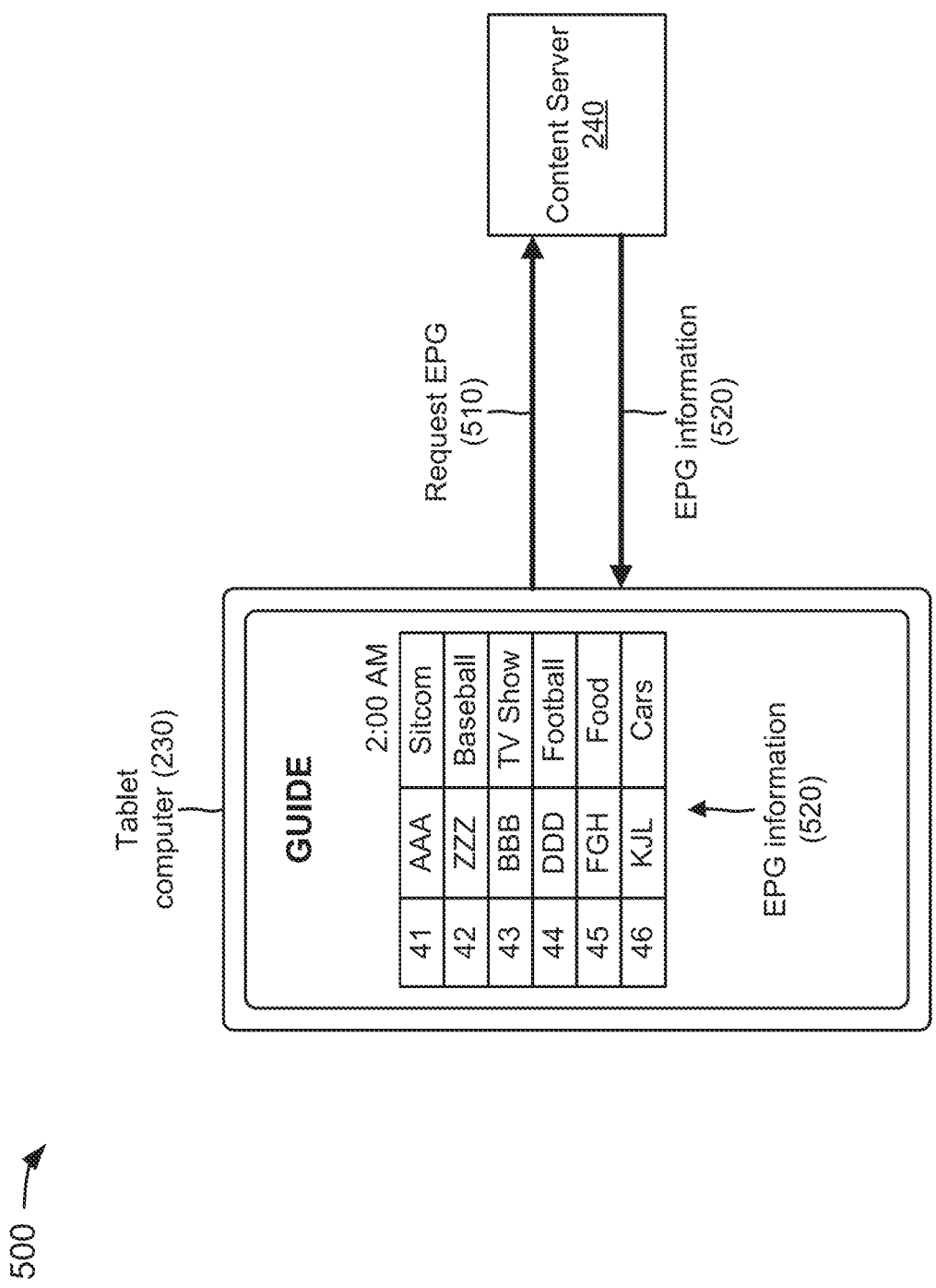

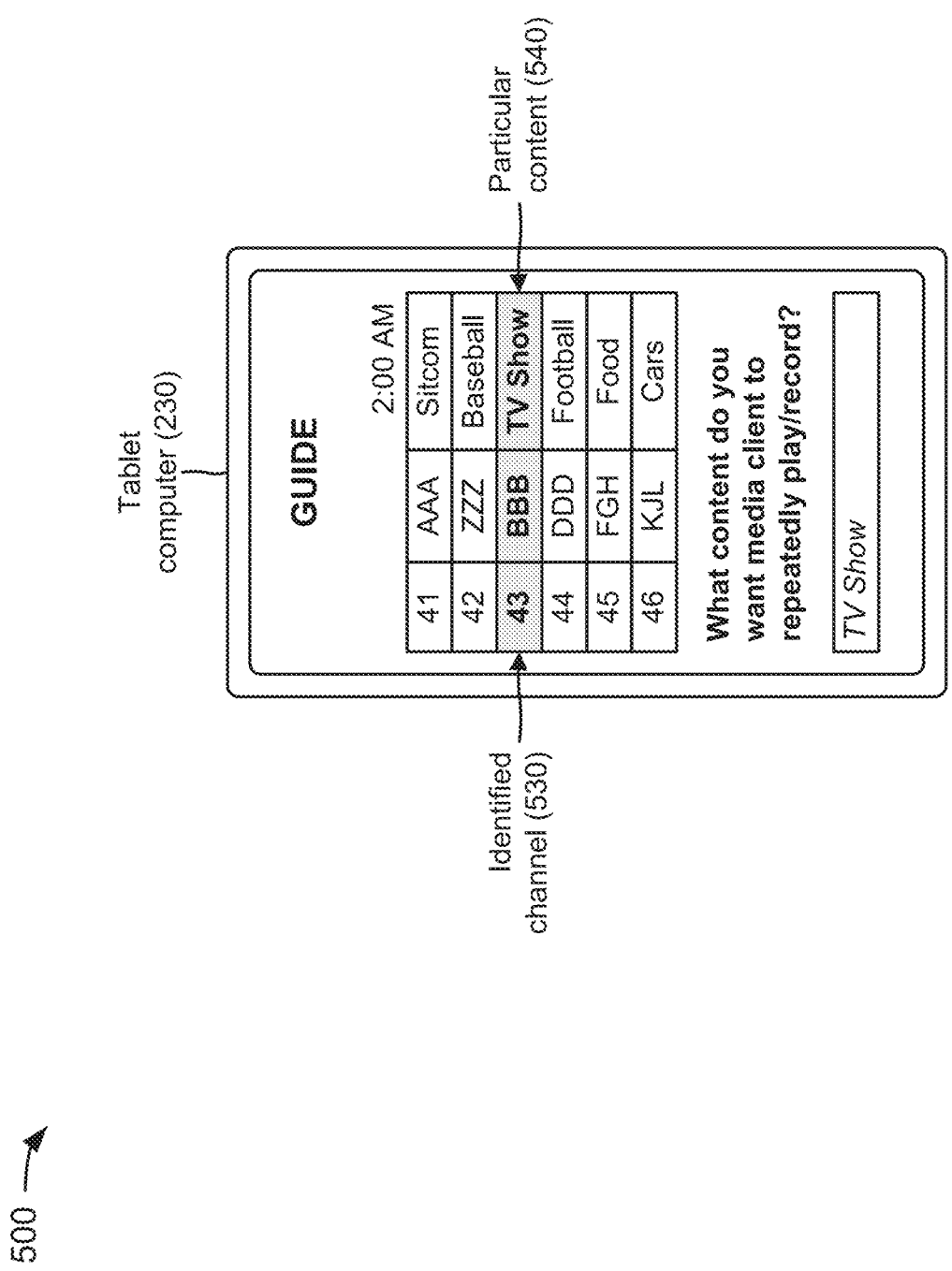

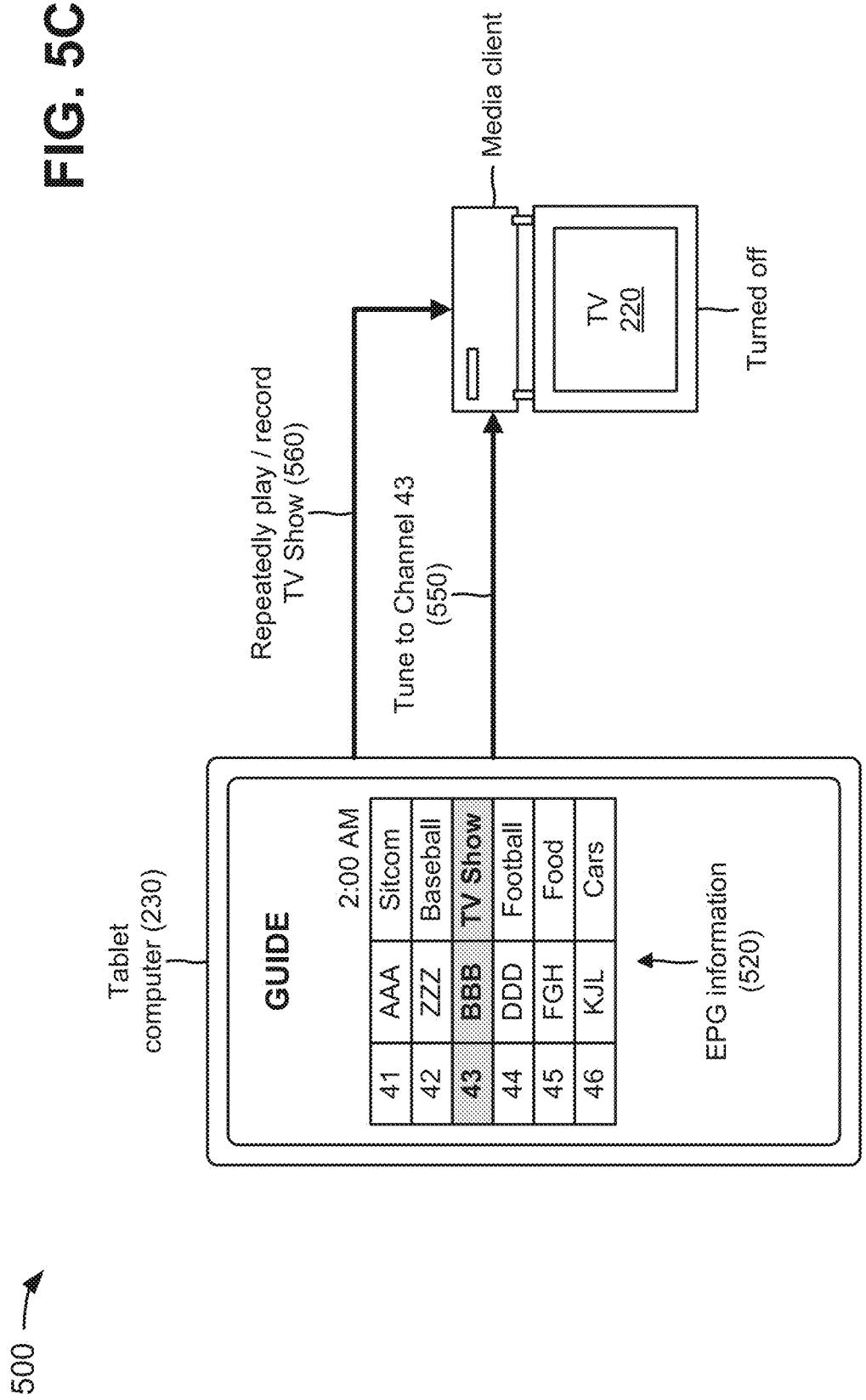

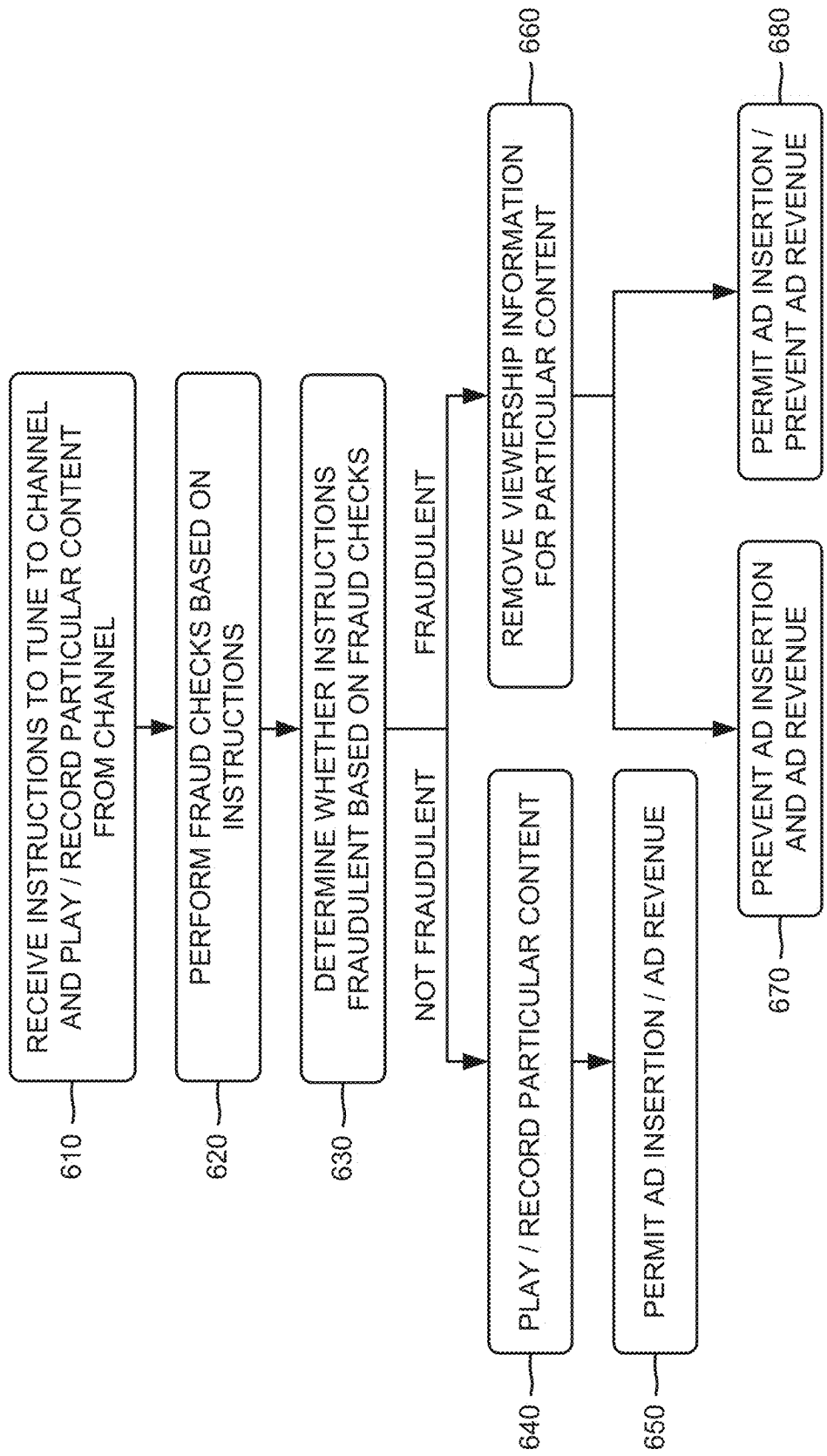

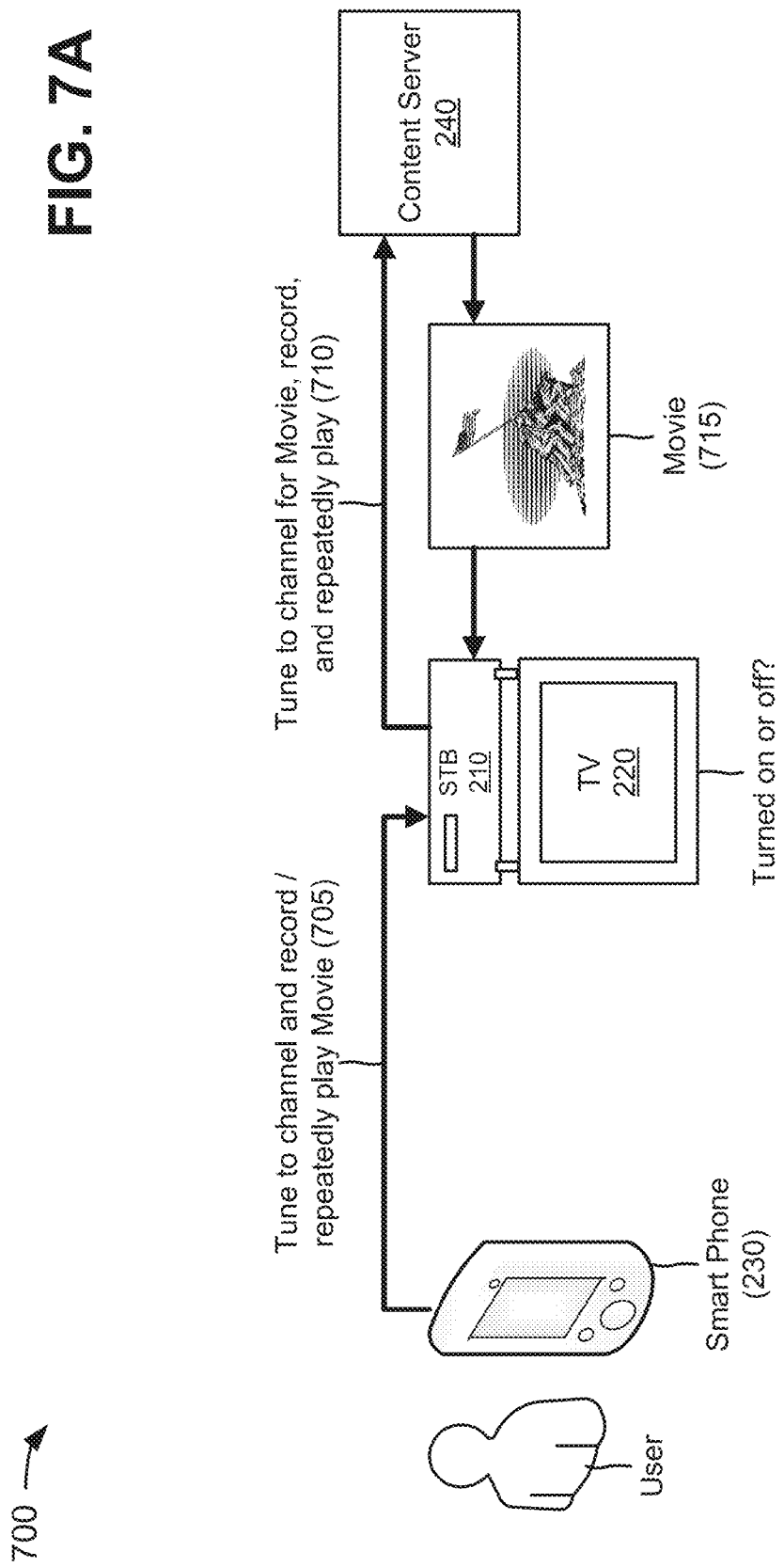

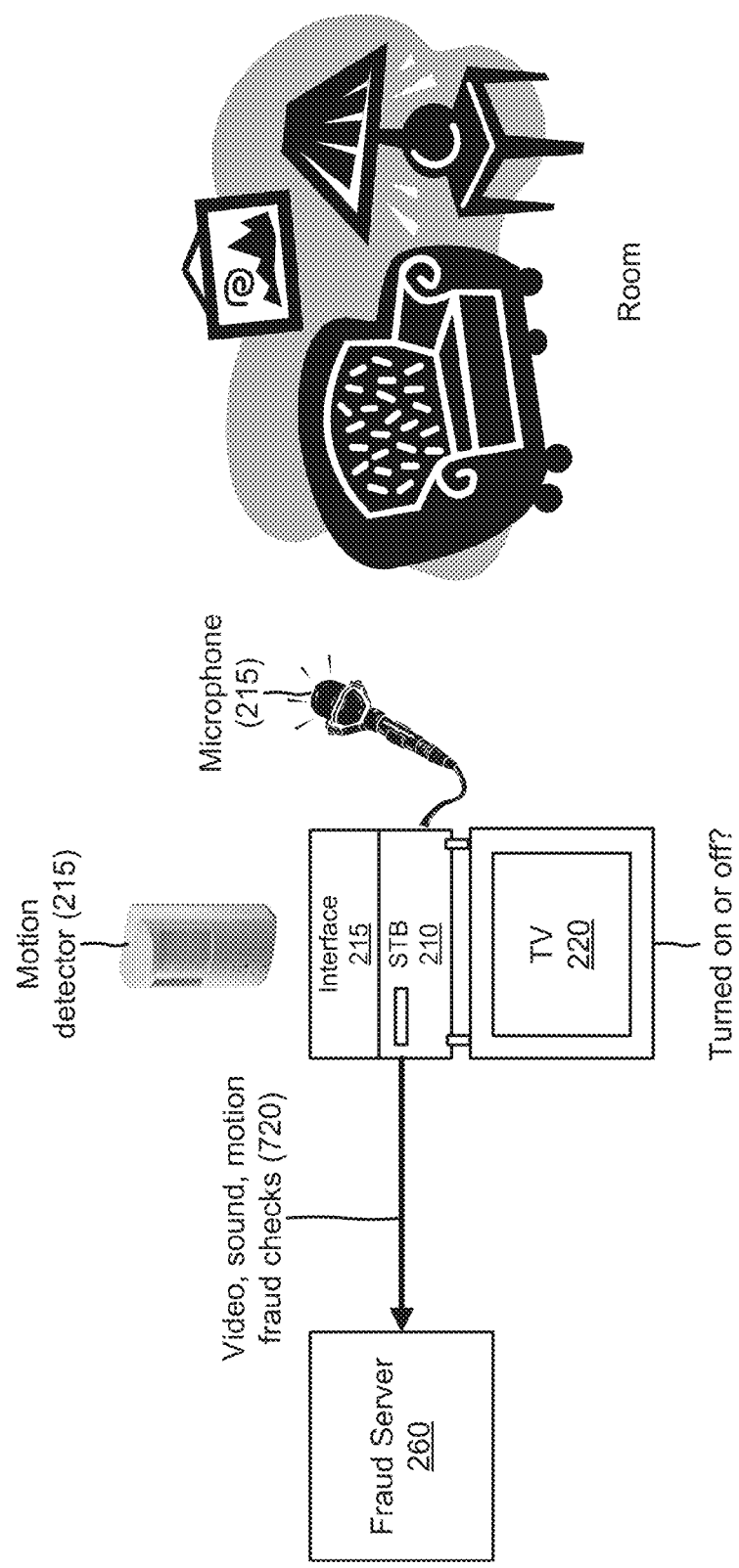

DETECTING AND PREVENTING FALSE TELEVISION VIEWERSHIP

BACKGROUND

Many television users (or viewers) regularly watch a number of television (TV) channels that display TV content, such as TV shows, pay-per-view (PPV) content, video-on-demand (VOD) content, etc. One or more commercials or advertisements (ads) may be displayed to the user during the airing of the TV content. Ad insertion systems have been developed that send advertisement video streams on independent advertisement channels at a time when a content channel (e.g., a television channel) enters an advertisement break. A media client (e.g., a set-top box (STB)), provided in a user's premises, may be instructed to change channels to the advertisement channel carrying the advertisement. The media client may also locally store advertisements, and may play the locally stored advertisements when a content channel enters an advertisement break.

BRIEF DESCRIPTION OF THE DRAWINGS

FIGS. 1A and 1B are diagrams of an overview of an example implementation described herein;

FIG. 2 is a diagram of an example environment in which systems and/or methods, described herein, may be implemented;

FIG. 3 is a diagram of example components of a device that may correspond to one or more of the devices of the environment depicted in FIG. 2;

FIG. 4 is a flow chart of an example process for instructing a media client to play and/or record particular content from a particular content channel;

FIGS. 5A-5D are diagrams of an example relating to the example process shown in FIG. 4;

FIG. 6 is a flow chart of an example process for detecting and preventing false television viewership; and FIGS. 7A-7D are diagrams of an example relating to the example process shown in FIG. 6.

DETAILED DESCRIPTION OF PREFERRED EMBODIMENTS

The following detailed description refers to the accompanying drawings. The same reference numbers in different drawings may identify the same or similar elements.

Service providers, such as television service providers, telecommunication service providers, or the like, utilize information received from media clients (e.g., STBs) to determine viewership for channels and/or television content. The viewership information may be used for ratings of the channels and/or television content, to determine whether to insert particular advertisements (e.g., local advertisements), to determine advertisement revenue, or the like. A control device (e.g., a personal computer, a smart phone, a tablet computer, or the like) may be used to remotely control media clients. For example, a control device may instruct a media client to tune to a particular television channel, play and/or record particular television content, or the like, even when a television, associated with the media client, is not turned on.

Figure 1B:
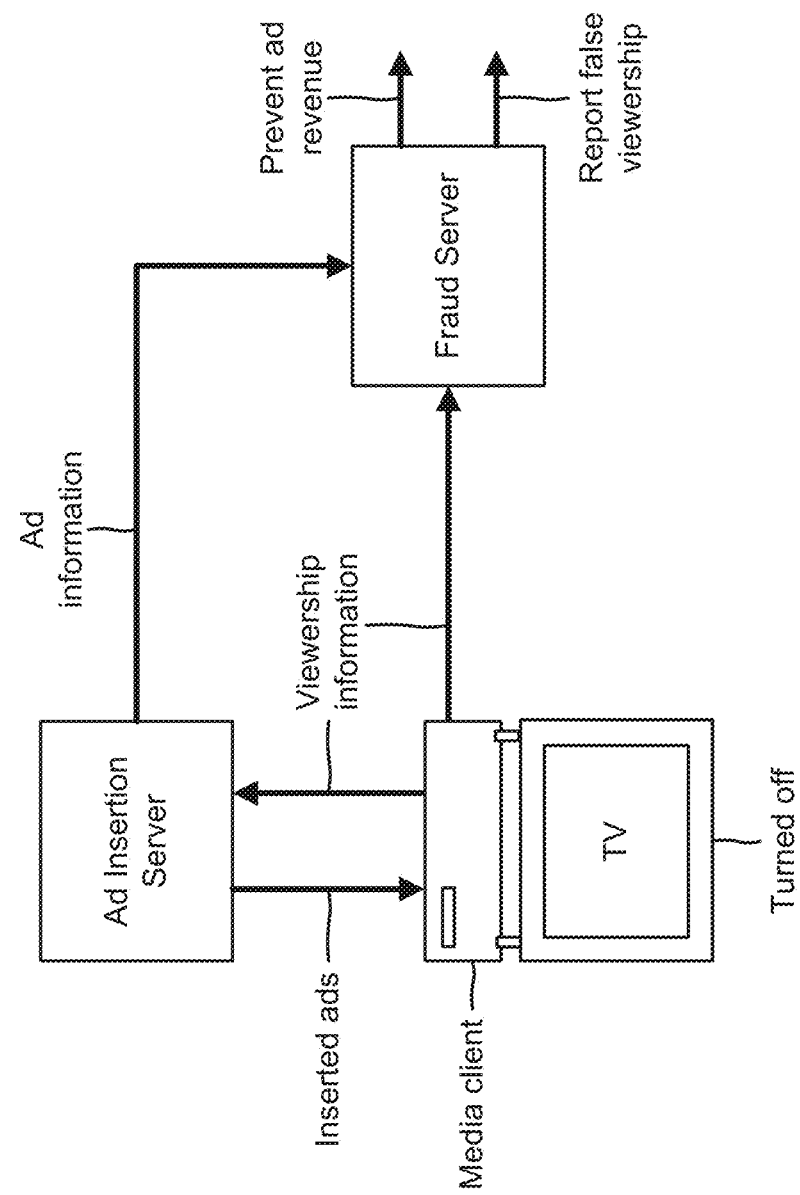

FIGS. 1A and 1B are diagrams of an overview of an example implementation 100 described herein. In example implementation 100 and as shown in FIG. 1A, assume that a media client is associated with a television (TV) that is turned off. Further, assume that a user associated with a control device (e.g., a smart phone) wishes to fraudulently increase ratings for a particular television show in order to increase advertisement revenue for advertisements aired during the show. The user may cause the smart phone to provide instructions that instruct the media client to tune to a channel associated with the show and to repeatedly play and/or record the show even when the TV is turned off. As further shown in FIG. 1A, the media client, based on the instructions received from the smart phone, may repeatedly tune to a channel(s) (e.g., provided by a content server) on which the show is played and/or recorded even though the TV is turned off. The content server may provide the show to the media client once or multiple times. In some implementations, the user may instruct the media client to record all occurrences of the show and play the recorded show over and over when the TV is turned off.

As shown in FIG. 1B, the media client may generate viewership information based on the playing and/or recording of the show, and may provide the viewership information to an ad insertion server and a fraud server. The viewership information may include information indicating a number of times the show is played and/or recorded by the media client, a number of times the recorded show is played, times of day when the show and/or the recorded show are played, or the like. The ad insertion server may provide advertisement video streams (e.g., relevant to a user of the media client) on independent advertisement channels at times when the show enters advertisement breaks. The ad insertion server may instruct the media client to change the channel of the show to the advertisement channels carrying the advertisements. Information associated with the inserted advertisements may be provided by the ad insertion server to the fraud server.

The media client and/or the fraud server may perform checks on the instructions received from the smart phone to determine whether the instructions are fraudulent (e.g., fraudulently increasing the show's ratings and/or advertisement revenues). For example, the media client and/or the fraud server may determine whether the viewership information satisfies a threshold number of views, indicates that the show is viewed at peculiar hours, or the like. In some implementations, the media client may be equipped with sensors that enable the media client to determine whether the TV is turned on during the playing of the show, whether motion is detected at a location of the TV, whether sound is detected at the location of the TV, or the like. Such checks may enable the media client and/or the fraud server to determine whether the instructions received from the smart phone are fraudulent.

If the media client and/or the fraud server determine, based on the checks, that the instructions received from the smart phone are not fraudulent, the media client may play and/or record the show, and may permit the ad insertion server to insert advertisements at times when the show enters advertisement breaks. The media client and/or the fraud server may also permit advertisement revenue to be accrued for the inserted advertisements when the instructions are not fraudulent.

If the media client and/or the fraud server determine that the instructions are fraudulent, the media client and/or the fraud server may discard the viewership information for the show to prevent false viewer ratings for the show, and may report the fraudulent instructions (e.g., to a service provider). In some implementations, the media client may prevent the ad insertion server from inserting advertisements at times when the show enters advertisement breaks, which may prevent advertisement revenue from accruing. In some implementations, the media client may permit the ad insertion server to insert advertisements at times when the show enters advertisement breaks, but the fraud server may prevent advertisement revenue from accruing for the inserted advertisements.

In some implementations, fans of a television show may not wish to increase advertisement revenue, but may wish to increase ratings for the show since the show is their favorite show. In such implementations, the fans may utilize an application on their control devices to instruct their media clients to repeatedly play and/or record the show even when their TVs are turned off. The media clients and/or the fraud server may not determine such instructions to be fraudulent, but the fraud server may prevent advertisement revenue from accruing for inserted advertisements associated with the show.

Systems and/or methods described herein may enable false television viewership to be detected and prevented from being used to increase television ratings and/or advertisement revenues. The systems and/or methods may permit fans of particular television content to increase ratings for the particular television content, but may prevent advertisement revenue from accruing for inserted advertisements associated with the particular television content.

As used herein, the term user is intended to be broadly interpreted to include a media client and/or a control device or a user of a media client and/or a control device. The term entity, as used herein, is intended to be broadly interpreted to include a business, an organization, a government agency, a control device, a user of a control device, or the like.

FIG. 2 is a diagram of an example environment 200 in which systems and/or methods, described herein, may be implemented. As illustrated, environment 200 may include a media client 210 with one or more sensors 215, a television (TV) 220, a control device 230, a content server 240, an advertisement (ad) insertion server 250, a fraud server 260, and a network 270. Devices/networks of environment 200 may interconnect via wired connections, wireless connections, or a combination of wired and wireless connections.

Media client 210 may include a device capable of receiving, transmitting, and/or processing multimedia content, and providing the multimedia content to a user (e.g., via television 220). Examples of media client 210 may include a set-top box (STB), a casting stick (e.g., a high-definition media interface (HDMI) dongle), a computer, a cable card, a gaming device, a portable electronic device, and/or another type of device capable of receiving, transmitting, and/or processing multimedia content and providing the multimedia content to a user. In some implementations, media client 210 may record content and provide copies of the content to control device 230. Media client 210 may include one or more tuners used to receive content broadcast to media client 210. In some implementations, media client 210 may allow a user to alter television programming provided to television 220 based on a signal (e.g., a channel up or channel down signal) received from a remote control. Media client 210 may record multimedia content in a digital format to a disk drive or another memory device within media client 210.

In some implementations, media client 210 may be incorporated directly within television 220 and/or may include a digital video recorder (DVR). In some implementations, media client 210 and television 220 may be replaced with a computing device, such as a personal computer, a laptop computer, a tablet computer, a gaming device, or the like. In some implementations, media client 210 may receive advertisement channels from ad insertion server 250, and may provide the advertisement channels to television 220 or another device during an advertisement break. In some implementations, media client 210 may include or communicate with one or more sensors 215. Sensors 215 may include a microphone to detect audio from a location (e.g., a room) associated with television 220, a motion detector to detect motion in the location associated with television 220, an audio/video interface (e.g., a high-definition multimedia interface (HDMI)) to detect audio signals, video signals, and/or handshake signals from television 220, or the like.

Television 220 may include a television monitor that is capable of displaying television programming, content provided by media client 210, and/or content provided by other devices (e.g., a digital video disk (DVD) player, a video camera, or the like) connected to television 220.

Control device 230 may include a device that is capable of communicating with media client 210 (e.g., either directly or via network 270). In some implementations, control device 230 may include a remote control; a radiotelephone; a personal communications services (PCS) terminal that may combine, for example, a cellular radiotelephone with data processing and data communications capabilities; a smart phone; a laptop computer; a tablet computer; or another type of computation and communication device.

Content server 240 may include one or more personal computers, one or more workstation computers, one or more server devices, one or more virtual machines (VMs) provided in a cloud computing environment, or one or more other types of computation and communication devices. In some implementations, content server 240 may be associated with an entity that manages and/or operates network 270, such as, for example, a telecommunication service provider, a television service provider, an Internet service provider, or the like.

In some implementations, content server 240 may include a computer system, an application, a cable head-end, and/or a broadcasting device capable of providing content (e.g., VOD content, high definition (HD)-VOD content, television programming, movies, on-demand services, live television, or the like), commercials, advertisements, instructions, and/or other information to media client 210.

Ad insertion server 250 may include one or more personal computers, one or more workstation computers, one or more server devices, one or more VMs provided in a cloud computing environment, or one or more other types of computation and communication devices. In some implementations, ad insertion server 250 may provide targeted advertisements to media client 210 for display on television 220. Ad insertion server 250 may monitor media client 210 to determine whether media client 210 is properly providing an advertisement. For example, ad insertion server 250 may determine whether media client 210 is tuned to an appropriate ad channel for retrieving the advertisement, may determine whether media client 210 is able to locate a program identifier (PID) for the advertisement, or the like. If ad insertion server 250 determines that media client 210 is not properly providing the advertisement, ad insertion server 250 may generate unique error codes (e.g., dependent upon what media client 210 failed to perform) and may instruct media client 210 to return to the previously viewed television content.

Fraud server 260 may include one or more personal computers, one or more workstation computers, one or more server devices, one or more VMs provided in a cloud computing environment, or one or more other types of computation and communication devices. In some implementations, fraud server 260 may communicate over network 270 with media client 210. Media client 210 may receive instructions to tune to a channel and play and/or record particular content from the channel. Media client 210 and/or fraud server 260 may perform fraud checks based on the instructions, and may determine whether the instructions are fraudulent based on the fraud checks. If media client 210/fraud server 260 determine that the instructions are not fraudulent, media client 210 may play and/or record the particular content, media client 210 may permit ad insertion by ad insertion system 250, and/or media client 210/fraud server 260 may permit ad revenue to accrue based on the inserted ads. If media client 210/fraud server 260 determines that the instructions are fraudulent, media client 210/fraud server 260 may remove viewership information for the particular content, and/or may prevent ad insertion and ad revenue accrual.

Network 270 may include a network, such as a local area network (LAN), a wide area network (WAN), a metropolitan area network (MAN), a telephone network, such as the Public Switched Telephone Network (PSTN) or a cellular network, a television network, an intranet, the Internet, a fiber optic network, a cloud computing network, or a combination of networks.

The number and arrangement of devices and/or networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

FIG. 3 is a diagram of example components of a device 300 that may correspond to one or more of the devices of environment 200. In some implementations, one or more of the devices of environment 200 may include one or more devices 300 or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit, or the like), a microprocessor, and/or any processing component (e.g., a field-programmable gate array (FPGA), an application-specific integrated circuit (ASIC), or the like) that interprets and/or executes instructions, and/or that is designed to implement a particular function. In some implementations, processor 320 may include multiple processor cores for parallel computing. Memory 330 may include a random access memory (RAM), a read only memory (ROM), and/or another type of dynamic or static storage component (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, or the like). Output component 350 may include a component that outputs information from device 300 (e.g., a display, a speaker, one or more light-emitting diodes (LEDs), or the like).

Communication interface 360 may include a transceiver-like component, such as a transceiver and/or a separate receiver and transmitter, which enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a high-definition multimedia interface (HDMI), or the like.

Device 300 may perform various operations described herein. Device 300 may perform these operations in response to processor 320 executing software instructions included in a computer-readable medium, such as memory 330. A computer-readable medium is defined as a non-transitory memory device. A memory device includes memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

FIG. 4 is a flow chart of an example process 400 for instructing a media client to play and/or record particular content from a particular content channel. In some implementations, one or more process blocks of FIG. 4 may be performed by control device 230. In some implementations, one or more process blocks of FIG. 4 may be performed by another device or a group of devices separate from or including control device 230, such as a server device that is capable of controlling media client 210.

As shown in FIG. 4, process 400 may include accessing an electronic program guide (EPG) for content (block 410). For example, a user may cause control device 230 to provide a request for an electronic program guide (e.g., for television content) to media client 210 and/or content server 240. In some implementations, control device 230 may include an application that permits the user to control media client 210. In some implementations, the application may include an application, a code snippet, a script, a widget, or the like that causes control device 230 to perform one or more functions. For example, the application may enable the user to send a request for the EPG to media client 210 and/or content server 240. Media client 210 and/or content server 240 may provide the EPG to control device 230 based on the request, and control device 230 may display the EPG.

In some implementations, the EPG may include an interactive or a non-interactive guide that provides users of television, radio, and/or other media applications with continuously updated menus. The menus may include broadcast programming information and/or scheduling information for current and upcoming programming. A non-interactive electronic program guide may include a digitally displayed, non-interactive menu of program scheduling information shown by a cable or satellite television service provider to viewers on a dedicated channel.

As further shown in FIG. 4, process 400 may include identifying a channel for particular content from the electronic program guide (block 420). For example, the user of control device 230 may wish to instruct media client 210 to play and/or record particular content (e.g., a television show, a movie, a sporting event, or the like), and may cause control device 230 to search the EPG for all occurrences of the particular content. In some implementations, control device 230 may identify a channel or channels, from the EPG, on which the particular content is or will be available. In some implementations, the user may utilize the application to provide information identifying the particular content to control device 230. In such implementations, the application may cause control device 230 to search the EPG for all occurrences of the particular content based on the provided information.

In one example, the user of control device 230 may be a fan of the particular content, and may wish to increase ratings associated with the particular content (e.g., so that the particular content continues to be broadcast by content server 240). In such an example, the actions of the user may not be considered fraudulent since the user does not receive any monetary compensation. In another example, the user of control device 230 may be an advertiser, and may wish to increase advertisement revenue associated with the user's advertisements shown during the particular content. In such an example, the actions of the user may be considered fraudulent since the user fraudulently receives monetary compensation (e.g., increased advertisement revenue).

As further shown in FIG. 4, process 400 may include providing, to a media client, an instruction to tune to the identified channel (block 430). For example, the user of control device 230 may cause control device 230 to provide an instruction to media client 210. In some implementations, the instruction may instruct media client 210 to tune to the channel identified by control device 230 from the EPG. In some implementations, the instruction may instruct media client 210 to tune to the identified channel at a time when the particular content is provided by content server 240 (e.g., based on information provided in the EPG). For example, if control device 230 determines that channel 59 (e.g., the identified channel) will air a television sitcom (e.g., the particular content) at 3:30 PM, the instruction may instruct media client 210 to tune to channel 59 at 3:30 PM. Alternatively, or additionally, in such an example, control device 230 may wait until 3:30 PM before sending the instruction to media client 210.

In some implementations, the application of control device 230 may enable the user to send the instruction to media client 210. For example, after the application identifies a channel for the particular content, the application may display information requesting whether the user wants to schedule media client 210 to tune to the identified channel when the particular content is aired. The user may interact with the displayed information in order to cause control device 230 to provide the instruction to media client 210.

As further shown in FIG. 4, process 400 may include providing, to the media client, an instruction to repeatedly play and/or record the particular content (block 440). For example, the user of control device 230 may cause control device 230 to provide another instruction to media client 210. In some implementations, the other instruction may instruct media client 210 to repeatedly play and/or record the particular content. In some implementations, the other instruction may instruct media client 210 to tune to the identified channel at a time when the particular content is provided by content server 240, and to play the particular content. For example, if control device 230 determines that channel 34 (e.g., the identified channel) will air a television drama (e.g., the particular content) at 2:30 PM, 6:30 PM, and 10:30 PM, the other instruction may instruct media client 210 to tune to channel 34 at 2:30 PM, 6:30 PM, and 10:30 PM and play the television drama. In some implementations, the other instruction may instruct media client 210 to record the television drama, and repeatedly play the recorded television drama.

In some implementations, the application of control device 230 may enable the user to send the other instruction to media client 210. For example, after the application identifies a channel for the particular content, the application may display information requesting whether the user wants media client 210 to repeatedly play and/or record the particular content. The user may interact with the displayed information in order to cause control device 230 to provide the other instruction to media client 210.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5D:
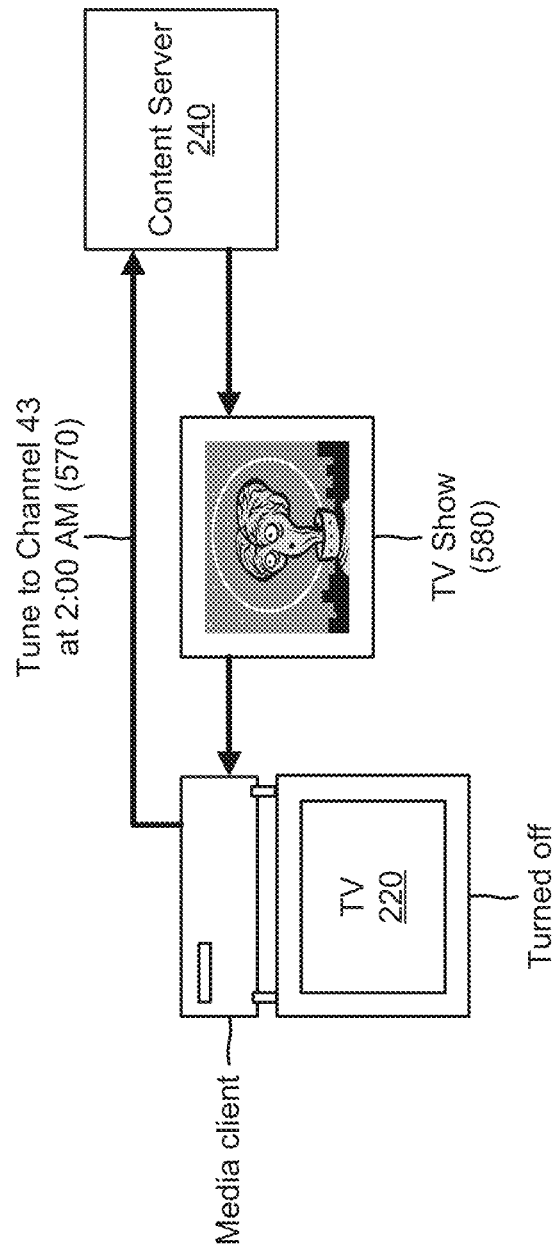

FIGS. 5A-5D are diagrams of an example 500 relating to example process 400 shown in FIG. 4. As shown in FIG. 5A, control device 230 (e.g., a tablet computer 230) may be utilized (e.g., by a user) to generate a request 510 for an electronic program guide (EPG), and to provide request 510 to content server 240. Content server 240 may receive request 510, and may determine whether tablet computer 230 has permission to receive the EPG from content server 240. For example, content server 240 may check credentials associated with tablet computer 230 and/or the user of tablet computer 230 to determine whether tablet computer 230 has permission to receive the EPG. Assuming that tablet computer 230 has permission to receive the EPG, content server 240 may provide EPG information 520 to tablet computer 230. As further shown in FIG. 5A, EPG information 520 may include information associated with the EPG, such as, for example, channel information (e.g., 41, 42, or the like), network identification information (e.g., AAA, ZZZ, or the like), content information (e.g., sitcom, baseball, TV Show, or the like), and time information (e.g., a date, a time of day, or the like) associated with the content.

As shown in FIG. 5B, tablet computer 230 may display a user interface that requests identification of content that the user wants media client 210 to repeatedly play and/or record. Assume that the user indicates, via the user interface, that the "TV Show" is the content that the user wants media client 210 to repeatedly play and/or record. Based on the user's identification of the "TV Show," tablet computer 230 may search EPG information 520 for occurrences of the "TV Show" in EPG information 520. For example, as further shown in FIG. 5B, tablet computer 230 may identify a channel 530 (e.g., Channel 43) that will air particular content 540 (e.g., the "TV Show") at 2:00 AM.

As shown in FIG. 5C, tablet computer 230 may generate a first instruction 550 based on the determination of identified channel 530 and particular content 540. First instruction 550 may instruct media client 210 to tune to identified channel 530 (e.g., Channel 43) at 2:00 AM, even though television 220 is turned off. Tablet computer 230 may also generate a second instruction 560 based on the determination of identified channel 530 and particular content 540.

Second instruction 560 may instruct media client 210 to repeatedly play and/or record particular content 540 (e.g., the "TV Show"), even though television 220 is turned off. For example, second instruction 560 may instruct media client 210 to record the "TV Show" and repeatedly play the recording of the "TV Show." As further shown in FIG. 5B, tablet computer 230 may provide first instruction 550 and second instruction 560 to media client 210.

As shown in FIG. 5D, media client 210 may tune to Channel 43 at 2:00 AM based on first instruction 550, as indicated by reference number 570. Content server 240 may provide the "TV Show" to media client 210 when media client 210 tunes to Channel 43, as indicated by reference number 580. Media client 210 may record the "TV Show," and may repeatedly play the recorded "TV Show" based on second instruction 560 and even though television 220 is turned off. Such an arrangement may cause viewership ratings for the "TV Show" to increase, and may cause advertisement revenue to increase for advertisements (e.g., provided by ad insertion server 250) associated with the "TV Show."

As indicated above, FIGS. 5A-5D are provided merely as an example. Other examples are possible and may differ from what was described with regard to FIGS. 5A-5D. In some implementations, the various operations described in connection with FIGS. 5A-5D may be performed automatically or at the request of a user.

FIG. 6 is a flow chart of an example process 600 for detecting and preventing false television viewership. In some implementations, one or more process blocks of FIG. 6 may be performed by media client 210. In some implementations, one or more process blocks of FIG. 6 may be performed by another device or a group of devices separate from or including media client 210, such as fraud server 260.

As shown in FIG. 6, process 600 may include receiving instructions to tune to a channel and play and/or record particular content from the channel (block 610). For example, a user of control device 230 may cause control device 230 to generate instructions that instruct media client 210 to tune to a channel and play and/or record particular content from the channel. Control device 230 may provide the instructions to media client 210, and media client 210 may receive the instructions.

In some implementations, the instructions may instruct media client 210 to tune to the channel at a time when the particular content is provided by content server 240. For example, if control device 230 determines that channel 3 will air a television game show (e.g., the particular content) at 9:30 AM, the instructions may instruct media client 210 to tune to channel 3 at 9:30 AM. In some implementations, the instructions may instruct media client 210 to tune to multiple channels (e.g., at different times) that air the particular content, and to play the particular content from each of the multiple channels. For example, if control device 230 determines that channels 34, 43, and 52 will air a television drama (e.g., the particular content) at 2:30 PM, 6:30 PM, and 10:30 PM, respectively, the instructions may instruct media client 210 to tune to channels 34, 43, and 52 at 2:30 PM, 6:30 PM, and 10:30 PM, respectively, and play the television drama. In some implementations, the instructions may instruct media client 210 to record the particular content, and repeatedly play the recorded particular content.

As further shown in FIG. 6, process 600 may include performing fraud checks based on the instructions (block 620). For example, media client 210 may perform fraud checks based on the instructions received from control device 230. In some implementations, media client 210 may provide the instructions to fraud server 260, and media client 210 and/or fraud server 260 may perform the fraud checks based on the instructions. In some implementations, the fraud checks may include determining whether television 220, associated with media client 210, is turned on. For example, media client 210 may connect to television 220 via sensor 215, such as an audio/video interface (e.g., a HDMI), and may utilize the audio/video interface to determine whether signals are being received from television 220. If signals are being received from television 220, via the audio/video interface, media client 210 may determine that television 220 is turned on. If signals are not being received from television 220, via the audio/video interface, media client 210 may determine that television 220 is turned off.

In some implementations, the fraud checks may include determining whether a person is located at a location of media client 210 and/or television 220. In one example, media client 210 may include or be associated with a sensor 215 (e.g., a microphone) that detects audio from a location (e.g., a room) associated with television 220. The audio detected by the microphone may be generated by television 220 and/or by a person located at the location of television 220. If the microphone detects audio from the location, media client 210 may determine that television 220 is turned on and/or that a person is located at the location of television 220. If the microphone does not detect audio from the location, media client 210 may determine that television 220 is turned off and/or that a person is not located at the location of television 220.

In another example, media client 210 may include or be associated with sensor 215 (e.g., a motion detector) that detects motion in a location (e.g., a room) associated with television 220. The motion detected by the motion detector may be generated by a person located at the location of television 220. If the motion detector detects motion from the location, media client 210 may determine that a person is located at the location of television 220. If the motion detector does not detect motion from the location, media client 210 may determine that a person is not located at the location of television 220.

In some implementations, the fraud checks may include determining whether the instructions require media client 210 to play and/or record the particular content an amount of times that satisfies a particular threshold. For example, media client 210 may determine the particular threshold to be a particular number that indicates that the instructions are causing media client 210 to fraudulently increase viewership ratings and/or advertisement revenue. In such am example, media client 210 may determine that the instructions satisfy the particular threshold when the instructions require media client 210 to play and/or record the particular content an amount of times that exceeds the particular number.

In some implementations, the fraud checks may include determining whether the instructions require media client 210 to play the particular content at peculiar times (e.g., outside of usual viewing times). For example, assume that viewership information associated with media client 210 indicates that a user of media client 210 typically watches television 220 until 11:00 PM at night. Further, assume that the instructions require media client 210 to record the particular content and continuously play the particular content at 3:00 AM in the morning. In such an example, media client 210 may determine that the instructions require media client 210 to play the particular content at a peculiar time (e.g., 3:00 AM). Utilizing the same example, now assume that the instructions require media client 210 to only record the particular content at 3:00 AM in the morning. In such an example, media client 210 may determine that the instructions do not require media client 210 to play the particular content at a peculiar time.

In some implementations, the fraud checks may include determining whether the instructions require media client 210 to perform actions that are inconsistent with historical information associated with media client 210. For example, assume that historical viewership information associated with media client 210 indicates that a user of media client 210 watches a particular show one time every day, and that the instructions require media client 210 to play the particular show four times every day. In such an example, media client 210 may determine that the instructions require media client 210 to perform actions that are inconsistent with the historical viewership information. In another example, assume that the historical viewership information indicates that the user of media client 210 watches sports, news, and weather every day, and that the instructions require media client 210 to record and/or play a gardening show two times every day. In such an example, media client 210 may determine that the instructions require media client 210 to perform actions that are inconsistent with the historical viewership information. In still another example, assume that the historical viewership information indicates that the user of media client 210 watches football every day, and that the instructions require media client 210 to record and/or play a football game two times every day. In such an example, media client 210 may determine that the instructions require media client 210 to perform actions that are consistent with the historical viewership information.

As further shown in FIG. 6, process 600 may include determining whether the instructions are fraudulent based on the fraud checks (block 630). For example, media client 210 may determine, based on the fraud checks, whether the instructions fraudulently increase viewership for the particular content and/or advertisement revenue associated with the particular content. In some implementations, media client 210 may determine that the instructions are fraudulent when television 220 is determined to be turned off based on signals not being received from television 220 by the audio/video interface of media client 210.

In some implementations, media client 210 may determine that the instructions are fraudulent when television 220 is determined to be turned off based on the microphone, associated with media client 210, not detecting audio from the location of television 220. In some implementations, media client 210 may determine that the instructions are fraudulent when the motion detector associated with media client 210 fails to detect motion at the location of television 220.

In some implementations, media client 210 may determine that the instructions are fraudulent when the instructions require media client 210 to play and/or record the particular content an amount of times that satisfy the particular threshold. In some implementations, media client 210 may determine that the instructions are fraudulent when the instructions require media client 210 to play the particular content at peculiar times. In some implementations, media client 210 may determine that the instructions are fraudulent when the instructions require media client 210 to perform actions that are inconsistent with historical information associated with media client 210.

In some implementations, media client 210 may assign weights (e.g., values, percentages, or the like) to results of the different fraud checks, and may calculate a fraud score for the instructions based on the assigned weights. For example, assume that media client 210 assigns a weight of 0.8 to the fraud check associated with the audio/video interface of media client 210, a weight of 0.7 to the fraud check associated with the microphone, a weight of 0.4 to the fraud check associated with the motion detector, a weight of 0.8 to the fraud check associated with the particular threshold, a weight of 0.5 to the fraud check associated with the peculiar times, and a weight of 0.6 to the fraud check associated with the historical information. Further, assume that media client 210 assigns a first value (e.g., 1) to a fraud check that determines the instructions to be fraudulent, and a second value (e.g., 0) to a fraud check that determines the instructions to not be fraudulent. Media client 210 may multiply the determined values for the fraud checks with the assigned weights and may add the results together to calculate the fraud score for the instructions. In some implementations, media client 210 may determine whether the fraud score satisfies a fraud threshold indicating that the instructions are fraudulent.

As further shown in FIG. 6, if the instructions are not fraudulent (block 630—NOT FRAUDULENT), process 600 may include playing and/or recording the particular content (block 640). For example, if media client 210 determine that the instructions are not fraudulent based on the fraud checks, media client 210 may play and/or record the particular content. In some implementations, media client 210 may tune to the channel at a particular time when the particular content is provided by content server 240, and may play and/or record the particular content. In some implementations, media client 210 may just record the particular content at the particular time, and may play the particular content at a later time.

As further shown in FIG. 6, if the instructions are not fraudulent (block 630—NOT FRAUDULENT), process 600 may include permitting advertisement insertion and/or advertisement revenue (block 650). For example, if media client 210 determine that the instructions are not fraudulent based on the fraud checks, media client 210 may permit ad insertion server 250 to insert advertisements at times when the particular content enters advertisement breaks. In some implementations, if media client 210 determine that the instructions are not fraudulent based on the fraud checks, media client 210 may also permit advertisement revenue to be accrued for the inserted advertisements.

As further shown in FIG. 6, if the instructions are fraudulent (block 630—FRAUDULENT), process 600 may include removing viewership information for the particular content (block 660). For example, if media client 210 determine that the instructions are fraudulent based on the fraud checks, media client 210 may remove viewership information for the particular content so that ratings for the particular content will not increase due to the instructions. In some implementations, media client 210 may remove the viewership information for the particular content from viewership information provided by media client 210 to a ratings device associated with a ratings entity (e.g., Nielson). In some implementations, the viewership information for the particular content may include information indicating a number of times the particular content is played and/or recorded by media client 210, a number of times the recorded particular content is played, times of day when the particular content and/or the recorded particular content are played, or the like.

As further shown in FIG. 6, if the instructions are fraudulent (block 630—FRAUDULENT), process 600 may include preventing advertisement insertion and advertisement revenue (block 670). For example, if media client 210 determine that the instructions are fraudulent based on the fraud checks, media client 210 may prevent ad insertion server 250 from inserting advertisements at times when the particular content enters advertisement breaks. In some implementations, if media client 210 determine that the instructions are fraudulent based on the fraud checks, media client 210 may also prevent advertisement revenue from being accrued.

Alternatively, if the instructions are fraudulent (block 630—FRAUDULENT), process 600 may include permitting advertisement insertion and prevent advertisement revenue (block 680). For example, if media client 210 determines that the instructions are fraudulent based on the fraud checks, media client 210 may permit ad insertion server 250 to insert advertisements at times when the particular content enters advertisement breaks. In some implementations, if media client 210 determines that the instructions are fraudulent based on the fraud checks, fraud server 260 may prevent advertisement revenue from being accrued for the inserted advertisements.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7C:
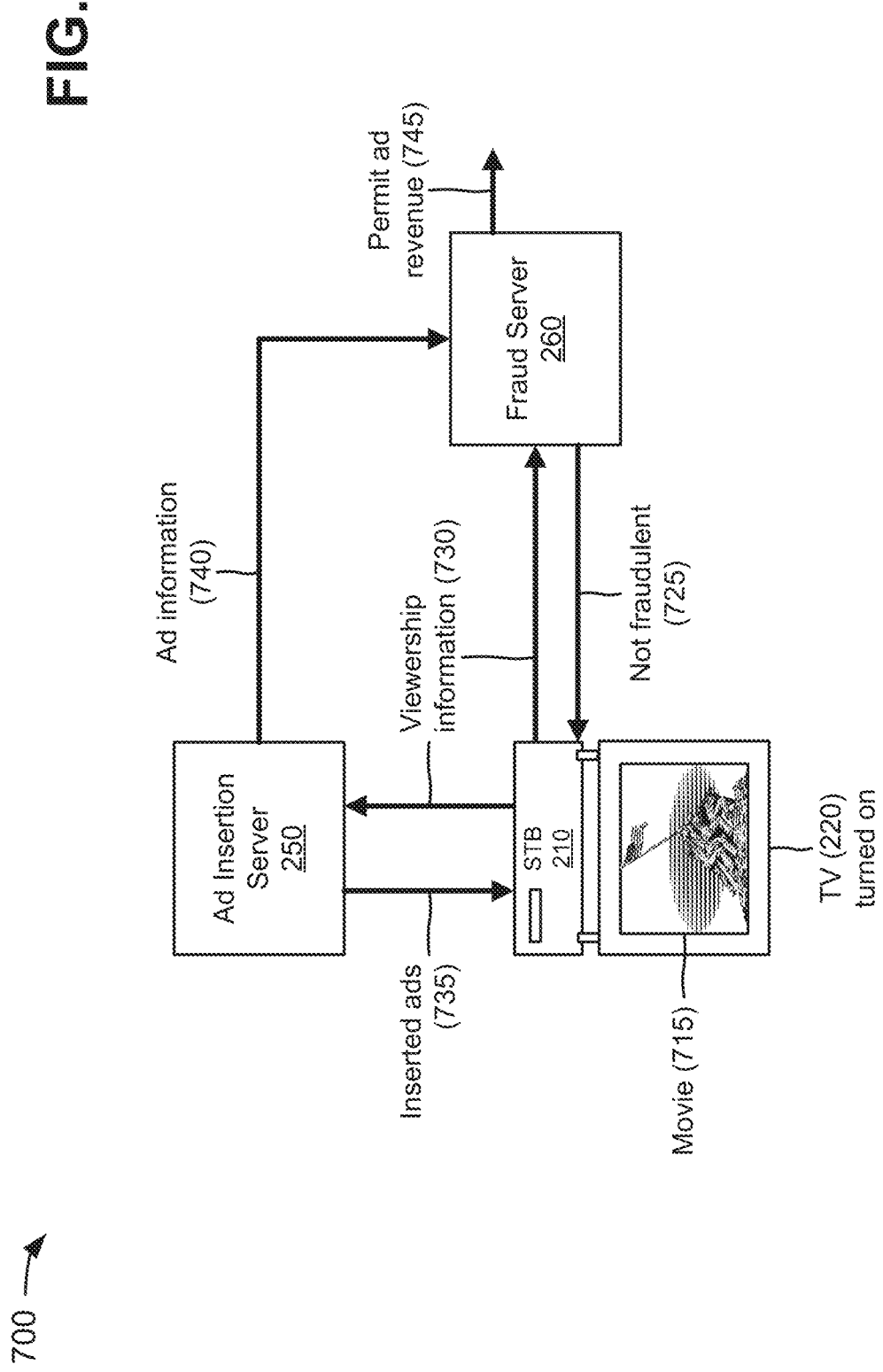

FIGS. 7A-7D are diagrams of an example 700 relating to example process 600 shown in FIG. 6. As shown in FIG. 7A, assume that a user associated with control device 230 (e.g., a smart phone 230) wishes to increase ratings for a particular movie, and causes smart phone 230 to generate instructions 705 that instruct media client 210 (e.g., STB 210) to tune to a channel associated with the movie, to record the movie, and to repeatedly play the movie. As further shown in FIG. 7A, smart phone 230 may provide instructions 705 to STB 210. STB 210, based on instructions 705, may tune to a channel (e.g., provided by content server 240) on which the movie is played, may record the movie, and may repeatedly play the movie (e.g., regardless of whether television 220 is turned on), as indicated by reference number 710. Content server 240 may provide movie 715 to STB 210 based on the actions of STB 210. In some implementations, the user may instruct STB 210 to record all occurrences of movie 715 and play the recorded movie 715 over and over. In some implementations, STB 210 may include multiple tuners, and the user may instruct the multiple tuners STB 210 to play and/or record multiple instances of movie 715.

As shown in FIG. 7B and prior to executing instructions 705, STB 210 may perform fraud checks utilizing a variety of sensors 215, such as an audio/video interface 215, a microphone 215, and a motion detector 215. STB 210 may connect to television 220 via audio/video interface 215, and may utilize audio/video interface 215 to determine whether signals are being received from television 220. If signals are being received from television 220, via audio/video interface 215, STB 210 may determine that television 220 is turned on. If signals are not being received from television 220, via audio/video interface 215, STB 210 may determine that television 220 is turned off. Such determinations may be referred to as a video fraud check.

Microphone 215 may detect audio from a location (e.g., a room) associated with television 220. The audio detected by microphone 215 may be generated by television 220 and/or by a person located in the room. If microphone 215 detects audio from the room, STB 210 may determine that television 220 is turned on and/or that a person is located in the room. If microphone 215 does not detect audio from the room, STB 210 may determine that television 220 is turned off and/or that a person is not located in the room. Such determinations may be referred to as a sound fraud check.

Motion detector 215 may detect motion in the room, which may be generated by a person located in the room. If motion detector 215 detects motion from the room, STB 210 may determine that a person is located in the room. If motion detector 215 does not detect motion from the room, STB 210 may determine that a person is not located in the room. Such determinations may be referred to as a motion fraud check.

As further shown in FIG. 7B, STB 210 may provide results 720 of the video fraud check, the sound fraud check, and the motion fraud check to fraud server 260. Fraud server 260 may perform other fraud checks on instructions 705, such as the fraud check associated with the particular threshold, the fraud check associated with the peculiar times, and/or the fraud check associated with the historical information. Fraud server 260 may utilize results 720 and results of the other fraud checks to determine whether instructions 705 are fraudulent.

As shown in FIG. 7C, assume that fraud server 260 determines that instructions 705 are not fraudulent based on results 720 and the results of the other fraud checks, and provides a message 725 to STB 210 indicating that instructions 705 are not fraudulent. Based on message 725, STB 210 may execute instructions 705, as described above in connection with FIG. 7A. STB 210 may generate viewership information 730 based on repeatedly playing the recording of movie 715, and may provide viewership information 730 to ad insertion server 250 and fraud server 260. Ad insertion server 250 may provide, to STB 210, inserted advertisements 735 on independent advertisement channels at times when movie 715 enters advertisement breaks. Ad insertion server 250 may instruct STB 210 to change the channel of movie 715 to the advertisement channels carrying inserted advertisements 735. Information 740 associated with inserted advertisements 735 may be provided by ad insertion server 250 to fraud server 260. As further shown in FIG. 7C, fraud server 250 may permit advertisement revenue to be accrued for inserted advertisements 735 since instructions 705 are not fraudulent, as indicated by reference number 745.

Figure 7D:
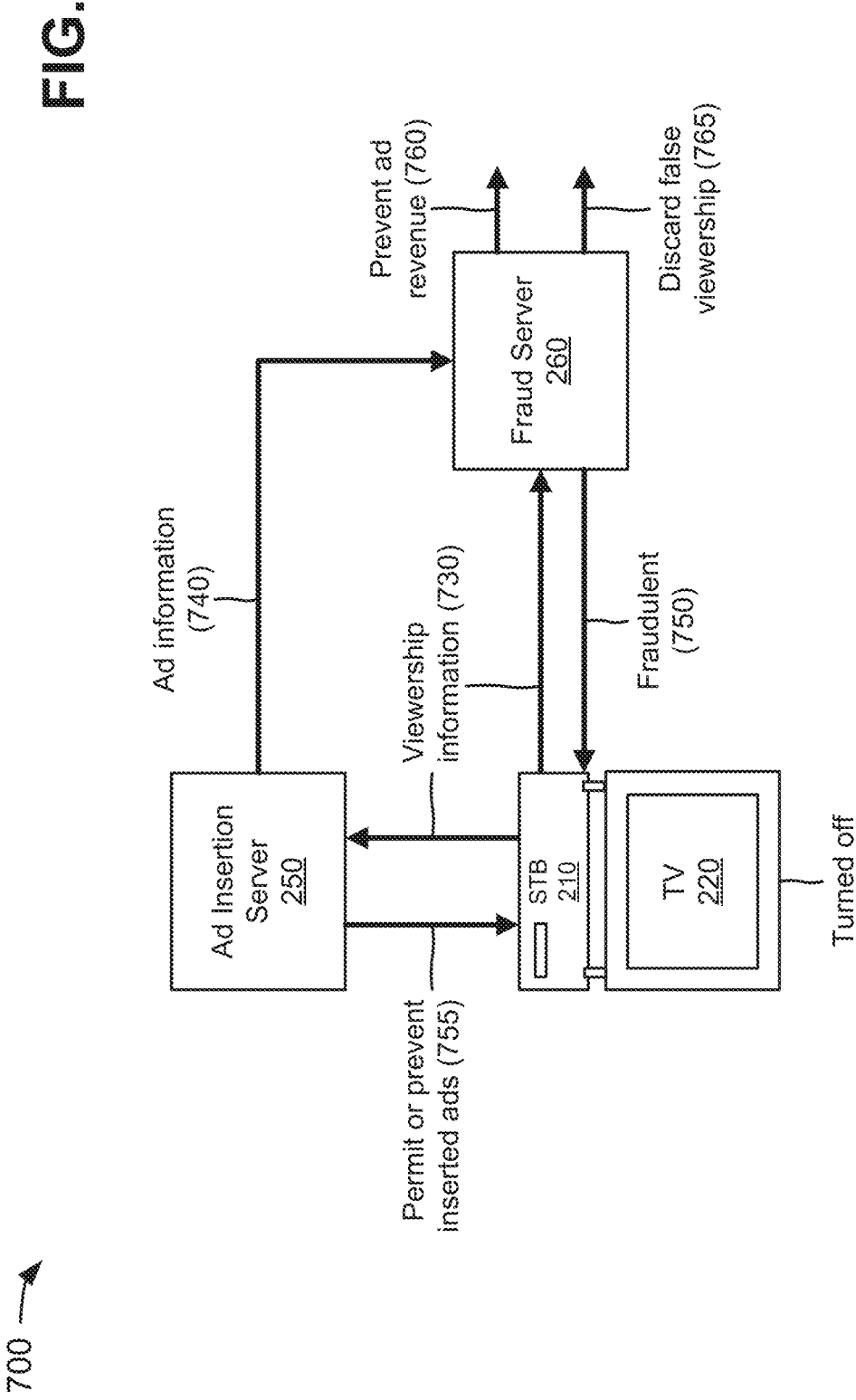

As shown in FIG. 7D, assume that fraud server 260 determines that instructions 705 are fraudulent based on results 720 and the results of the other fraud checks, and provides a message 750 to STB 210 indicating that instructions 705 are fraudulent. Based on message 750, STB 210 may still generate viewership information 730 based on repeatedly playing the recording of movie 715, and may provide viewership information 730 to ad insertion server 250 and fraud server 260. In some implementations, STB 210 may permit ad insertion server 250 to insert advertisements at times when movie 715 enters advertisement breaks, as indicated by reference number 755, but fraud server 260 may prevent advertisement revenue from accruing for the inserted advertisements, as indicated by reference number 760. In some implementations, STB 210 may prevent ad insertion server 250 from inserting advertisements at times when movie 715 enters advertisement breaks, as also indicated by reference number 755, which may prevent advertisement revenue from accruing. As further shown in FIG. 7D, when fraud server 260 determines that instructions 705 are fraudulent, fraud server 260 may discard viewership information 730 to prevent false viewer ratings for movie 715, as indicated by reference number 765, and may report the fraudulent instructions 705 (e.g., to a service provider).

As indicated above, FIGS. 7A-7D are provided merely as an example. Other examples are possible and may differ from what was described with regard to FIGS. 7A-7D. In some implementations, the various operations described in connection with FIGS. 7A-7D may be performed automatically or at the request of a user.

Systems and/or methods described herein may enable false television viewership to be detected and prevented from being used to increase television ratings and/or advertisement revenues. The systems and/or methods may permit fans of particular television content to increase ratings for the particular television content, but may prevent advertisement revenue from accruing for inserted advertisements associated with the particular television content.

The foregoing disclosure provides illustration and description, but is not intended to be exhaustive or to limit the implementations to the precise form disclosed. Modifications and variations are possible in light of the above disclosure or may be acquired from practice of the implementations.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

A component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

User interfaces may include graphical user interfaces (GUIs) and/or non-graphical user interfaces, such as text-based interfaces. The user interfaces may provide information to users via customized interfaces (e.g., proprietary interfaces) and/or other types of interfaces (e.g., browser-based interfaces, or the like). The user interfaces may receive user inputs via one or more input devices, may be user-configurable (e.g., a user may change the sizes of the user interfaces, information displayed in the user interfaces, color schemes used by the user interfaces, positions of text, images, icons, windows, or the like, in the user interfaces, or the like), and/or may not be user-configurable. Information associated with the user interfaces may be selected and/or manipulated by a user (e.g., via a touch screen display, a mouse, a keyboard, a keypad, voice commands, or the like). In some implementations, information provided by the user interfaces may include textual information and/or an audible form of the textual information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, instructions to record particular content and repeatedly play the recorded particular content;
   recording, by the device, the particular content based on the instructions;
   repeatedly playing, by the device, the recorded particular content based on the instructions;
   performing, by the device, one or more fraud checks based on the instructions,
      the one or more fraud checks including:
         a determination that historical viewership information, associated with the device, indicates that a user of the device watches a particular type of content, and
         a determination of whether a type of content, associated with the recorded particular content, is the same as the particular type of content;
   determining, by the device, whether the instructions are fraudulent based on the one or more fraud checks; and
   selectively providing, by the device and based on whether the instructions are fraudulent, viewership information for the particular content to a ratings device associated with a ratings entity,
      the viewership information for the particular content being provided to the ratings device when the instructions are not fraudulent, and
      the viewership information for the particular content being discarded when the instructions are fraudulent.

2. The method of claim 1, where, when the instructions are not fraudulent, the method further comprises:
   permitting an advertisement to be played when the recorded particular content is repeatedly played; and
   permitting revenue associated with playing the advertisement to be accrued.

3. The method of claim 1, where, when the instructions are fraudulent, the method further comprises:
   permitting an advertisement to be played when the recorded particular content is repeatedly played; and
   preventing revenue associated with playing the advertisement from being accrued.

4. The method of claim 1, where, when the instructions are fraudulent, the method further comprises:
  preventing an advertisement from being played when the recorded particular content is repeatedly played.

5. The method of claim 1, where the one or more fraud checks include two or more of:
  a determination of whether a television associated with the device is turned on based on whether a signal is received from the television by an interface of the device;
  a determination of whether the television is turned on based on whether sound is received by a microphone associated with the device; or
  a determination of whether a user is located at a location of the television based on whether a presence of the user is detected by a motion detector associated with the device.

6. The method of claim 1, where the one or more fraud checks include two or more of:
  a determination of whether the instructions require the device to play the recorded particular content an amount of times that satisfies a particular threshold;
  a determination of whether the instructions require the device to play the recorded particular content at peculiar times of a day; or
  a determination of whether the instructions require the device to perform actions that are inconsistent with historical information associated with the device.

7. The method of claim 1, where the one or more fraud checks include a first fraud check and a second fraud check, and the method further comprises:
  assigning a first weight to the first fraud check;
  assigning a second weight to the second fraud check, the first weight being different than the second weight;
  calculating a fraud score for the instructions based on the first weight and the second weight; and
  determining whether the instructions are fraudulent based on the fraud score.

8. A device, comprising:
  one or more processors to:
    receive instructions to repeatedly play particular content broadcast at a plurality of different times;
    repeatedly play the particular content based on the instructions and at the plurality of different times;
    perform a plurality of fraud checks relating to the repeated playing of the particular content,
      the plurality of fraud checks including:
        a determination that historical viewership information, associated with the device, indicates that a user of the device watches a particular type of content, and
        a determination of whether a type of content, associated with the repeatedly played particular content, is the same as the particular type of content;
    determine whether the instructions are fraudulent based on the plurality of fraud checks; and
    selectively provide, based on whether the instructions are fraudulent, viewership information for the particular content to a ratings device that calculates a rating for the particular content,
      the viewership information for the particular content being provided to the ratings device when the instructions are not fraudulent, and
      the viewership information for the particular content being discarded when the instructions are fraudulent.

9. The device of claim 8, where, when the instructions are not determined to be fraudulent, the one or more processors are further to:
  permit an advertisement to be played when the particular content is repeatedly played; and
  permit revenue associated with playing the advertisement to be accrued.

10. The device of claim 8, where, when the instructions are determined to be fraudulent, the one or more processors are further to:
  permit an advertisement to be played when the particular content is repeatedly played; and
  prevent revenue associated with playing the advertisement from being accrued.

11. The device of claim 8, where, when the instructions are determined to be fraudulent, the one or more processors are further to:
  prevent an advertisement from being played when the particular content is repeatedly played.

12. The device of claim 8, where the plurality of fraud checks include two or more of:
  a determination of whether a television associated with the device is turned on based on whether a signal is received from the television by an interface of the device;
  a determination of whether the television is turned on based on whether sound is received by a microphone associated with the device; or
  a determination of whether movement is detected at a location of the television based on whether the movement is detected by a motion detector associated with the device.

13. The device of claim 8, where the plurality of fraud checks include two or more of:
  a determination of whether the instructions require the device to play the particular content an amount of times that satisfies a particular threshold;
  a determination of whether the instructions require the device to play the particular content at a peculiar time of a day; or
  a determination of whether the instructions require the device to perform actions that are inconsistent with historical information associated with the device.

14. The device of claim 8, where the one or more processors are further to:
  assign different weights to each of the plurality of fraud checks;
  calculate a fraud score for the instructions based on the assigned weights; and
  determine whether the instructions are fraudulent based on the fraud score.

15. A computer-readable medium for storing instructions, the instructions comprising:
  one or more instructions that, when executed by one or more processors of a device, cause the one or more processors to:
    receive device instructions to record television content and repeatedly play the recorded television content;
    record the television content based on the device instructions;
    repeatedly play the recorded television content based on the device instructions;
    perform one or more fraud checks based on the repeated playing of the recorded television content,
      the one or more fraud checks including:
        a determination that historical viewership information, associated with the device, indicates that a user of the device watches a particular type of television content, and a determination of whether a type of television content, associated with the recorded television content, is the same as the particular type of television content;

determine whether the device instructions are fraudulent based on the one or more fraud checks; and selectively provide, when the device instructions are not fraudulent, viewership information for the television content to a ratings device that determines a rating for the television content, or discard, when the device instructions are fraudulent, the viewership information for the television content.

16. The computer-readable medium of claim 15, where, when the device instructions are not fraudulent, the one or more instructions, when executed by the one or more processors, further cause the one or more processors to:

permit an advertisement to be played when the recorded television content is repeatedly played; and permit revenue associated with playing the advertisement to be accrued.

17. The computer-readable medium of claim 15, where, when the device instructions are fraudulent, the one or more instructions, when executed by the one or more processors, further cause the one or more processors to:

permit an advertisement to be played when the recorded television content is repeatedly played; and prevent revenue associated with playing the advertisement from being accrued.

18. The computer-readable medium of claim 15, where, when the device instructions are fraudulent, the one or more instructions, when executed by the one or more processors, further cause the one or more processors to:

prevent an advertisement from being played when the recorded television content is repeatedly played.

19. The computer-readable medium of claim 15, where the one or more fraud checks include two or more of:

a determination of whether a television, associated with the device, is turned off based on whether a signal is received from the television by an interface of the device;

a determination of whether the television is turned off based on whether sound is received by a microphone associated with the device;

a determination of whether motion is detected at a location of the television based on whether the motion is detected by a motion detector associated with the device;

a determination of whether the device instructions require the device to play the recorded television content an amount of times that satisfies a particular threshold;

a determination of whether the device instructions require the device to play the recorded television content at a peculiar time of a day; or a determination of whether the device instructions require the device to perform actions that are inconsistent with historical information associated with the device.

20. The computer-readable medium of claim 15, where the one or more fraud checks include a first fraud check and a second fraud check, and the one or more instructions, when executed by the one or more processors, further cause the one or more processors to:

assign a first weight to the first fraud check;

assign a second weight to the second fraud check, the first weight being different than the second weight;

calculate a fraud score for the instructions based on the first weight and the second weight; and determine whether the instructions are fraudulent based on the fraud score.

* * * * *